United States Patent Office.

DAVID L. BARTLETT AND GERMAN H. HUNT, OF BALTIMORE, MARYLAND, ASSIGNEES OF STUART GWYNN.

*Letters Patent No.* 51,584, *dated December* 19, 1865; *antedated December* 5, 1865; *reissue No.* 2,623, *dated May* 28, 1867.

DIVISION A.

IMPROVED OPAQUE PIGMENTS.

The Schedule referred to in these Letters Patent and making part of the same.

Be it known that I, STUART GWYNN, of the city, county, and State of New York, have invented a new article of manufacture, which I call "Opaque Pigments;" and I declare the following to be a full description thereof.

The process by which the same is made will be fully described in the specification annexed to Letters Patent for which I am about to apply. This application being for Letters Patent for said pigments as an article of manufacture, it is unnecessary to describe either said process or the machinery employed therein.

In all pigments the minuteness of the particles or grains is one of the most important features. It will be readily seen that the larger number of particles in a given weight of pigment the larger surface it will cover when applied, and the thinner and more delicate the stratum of paint necessary to produce the desired opacity. Experiments have shown me that as the particles or pigments are made finer the tint becomes more brilliant and delicate and the stratum more opaque in proportion to its thickness; also, that the specific gravity of the mass was much increased. I have, in view of this experience, expended much time in efforts to produce pigments with finer particles, or to pulverize the particles of pigments now in use, by some process that should be practically economical. The pigments I call opaque pigments, made by a process for which I have applied for Letters Patent, have all these qualities. They are made from almost all the articles now used as pigments, treated by my process; that is to say first purified thoroughly and then subjected to great pressure, sufficient to crush and pulverize the normal atoms or molecules or particles. Pigments thus treated undergo an entire change of atomic structure, in addition to the great multiplication of particles, consequent upon the crushing of the normal atoms. The particles resulting from the crushing are amorphous and the material more dense than before.

An outline of the process, as applied to different articles, will more clearly describe the pigment when finished. All materials must be first purified. This is done by subjecting them to heat, the degree varying according to the article, but in each case as high as it will bear without injury. While in a heated condition it is well to inject into it and through it superheated steam, heated air, gases, or vapors, or fluids, as the same is of a nature to aid in expelling the foreign matter held in the pigment undergoing treatment, one pigment requiring one injection and another requiring another, according to the impurities each contains. It must be remembered that this is all done simply for the purpose of clearing the crude article of all foreign matters and leaving its particles in such a condition that they will be the more easily crushed when the pressure is applied in the second part of the process. The heat is applied in about the following degrees, that is to say, to carmine, 100° Fahrenheit; aniline colors, 250° to 400°; oxide of zinc, arsenical and chrome colors, 500°; carbon colors, 600°; sulphate of lead and carbonate of lead, 800°; oxide of iron and some other metallic paints, 1000° In all cases the degree of heat should be a little lower than the highest degree the pigment treated will bear without injury, and the injection, if any, should be of a little lower temperature than the pigment. After the matter has been thus thoroughly purified it is then subjected to great pressure, say from two to ten tons to the square inch, by which the normal atoms, molecules, or particles of the crude pigment are crushed and pulverized. Pigments of nearly every kind may be thus treated effectually; that is to say, after expelling the foreign matter held in all crude pigments by my process, pressure will crush, condense, and pulverize the particles and very greatly increase the value of the article as a paint.

I deposit in the Patent Office specimens of the article herein described.

What I claim, and desire to secure by Letters Patent, as a new article of manufacture, is—

Opaque pigments, made from any article whose normal atoms or molecules or particles have been crushed by pressure after having been purified, substantially as herein set forth.

STUART GWYNN.

Witnesses:
WILLIAM STANDISH,
GEORGE BOOTH.